(No Model.)

A. D. POWERS.
PULVERIZER AND HARROW.

No. 522,489. Patented July 3, 1894.

WITNESSES:  
Chas. Niden  
C. Sedgwick

INVENTOR  
A. D. Powers  
BY Munn & Co.  
ATTORNEYS.

UNITED STATES PATENT OFFICE.

ALBERT D. POWERS, OF OWENSBOROUGH, KENTUCKY.

PULVERIZER AND HARROW.

SPECIFICATION forming part of Letters Patent No. 522,489, dated July 3, 1894.

Application filed March 31, 1894. Serial No. 505,854. (No model.)

*To all whom it may concern:*

Be it known that I, ALBERT D. POWERS, of Owensborough, in the county of Daviess and State of Kentucky, have invented a new and Improved Pulverizer and Harrow, of which the following is a full, clear, and exact description.

My invention relates to an agricultural implement, and it has for its object to provide a harrow which will thoroughly pulverize the ground, and which will likewise be capable of use as a cultivator.

A further object of the invention is to so construct the pulverizer and harrow that rows of teeth will be located at the front and rear of a wheel-supported frame, which teeth will be actuated from the same driving mechanism and will be alternately operated, being raised by the driving mechanism and dropped by gravity, the teeth being so formed that the front ones will act in the same manner as a series of hoes, while the rear teeth will act in the capacity of a rake.

A further object of the invention is to provide a means whereby all of the teeth may be readily raised from contact with the ground for the purpose of removing the implement from one field to another.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
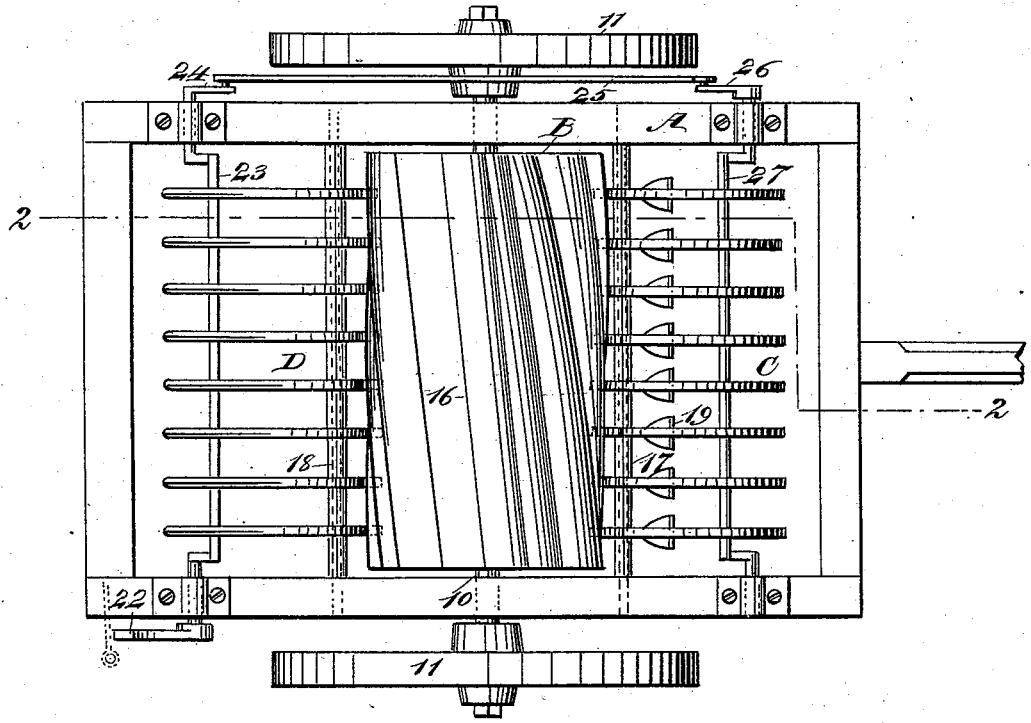
Figure 2:
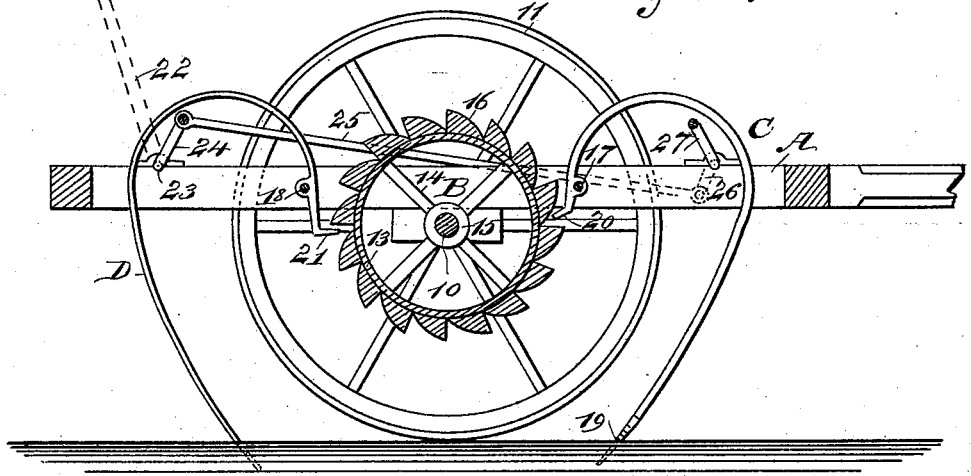

Figure 1 is a plan view of the implement; and Fig. 2 is a longitudinal vertical section taken essentially on the line 2—2 of Fig. 1.

In carrying out the invention a frame A, is employed, which may be made of wood, and the said frame is usually of rectangular shape and of skeleton construction. An axle 10, is located about centrally beneath the frame, being held to turn in suitable bearings, and supporting wheels 11, of any approved pattern, are secured upon the axle, so that the axle and wheels will turn together. A drum B, is mounted upon that portion of the axle located between the sides of the frame A. The said drum usually consists, as shown in Fig. 2, of a hollow cylindrical body 13, constructed of wood or of other light material, and spokes 14, which connect the body with a hub 15, the latter being secured to the axle. The outer surface of the body 13 of the drum is covered preferably by a series of metal plates, said plates being arranged close together so that they cover the body 13 circumferentially and longitudinally, the plates being provided with teeth 16, extending spirally and longitudinally thereof, and the teeth of each plate are so arranged that spiral ribs or unbroken teeth are produced, extending from one end of the drum to the other, when the drum is entirely covered by said plates. The teeth are shaped in cross section as shown in Fig. 2, in which one face is shown as straight, standing at a right angle to the drum, the other face being cylindrical, but if in practice it is found desirable the teeth or ribs 16 may be made in suitable lengths to extend from end to end of the drum.

A shaft is journaled in the frame at each side of the toothed drum, said shafts being designated as 17 and 18. The forward shaft 17, is adapted as a pivot for the forward set of teeth C, while the rear shaft 18 serves in a like capacity for a rear set of teeth D. The shafts 17 and 18 are stationary, and the forward teeth C, are pivotally mounted at their inner ends upon the said shaft 17, and are curved from the shaft upwardly and forwardly, their upper sections being practically of a bow shape; and from their upper bow portions the front teeth are carried downwardly and rearwardly and are made to terminate at their lower ends in blades 19 of shovel-like construction; but the blades may be otherwise formed if in practice it is found desirable.

Below the pivot of each forward tooth C, the tooth is provided with a rearwardly-projecting shoe 20, which shoes are adapted to be engaged by the cylindrical faces of the teeth or ribs 16 on the drum. The rear teeth D, are practically of the same formation as the forward teeth, are pivotally mounted at their upper forward ends, and are upwardly and rearwardly curved at their upper sections, and from thence are downwardly and forwardly curved, and are pointed at their forward ends instead of being provided with the blades 19. The forward and rear sets of teeth are thus oppositely curved, the lower ends of the forward set having a rearward inclination while the lower ends of the rearward set have a forward inclination. Preferably a like number of teeth is employed in both the front and rear set, and the teeth of each set are placed directly opposite, so that each tooth in the front set has a mate in the rear set. The rear set of teeth is provided, each below its pivot, with a shoe 21, to be engaged by the cylindrical surfaces of the ribs or teeth 16 of the drum, the said teeth or ribs of the drum acting in a downwardly direction upon the shoes 20 of the forward set of teeth, and in an upwardly direction upon the shoe 21 of the rear set of teeth. Thus it will be observed that the drum will be rotated as the machine is drawn forward, and owing to the spiral location of the ribs on the drum, the teeth in each set will be alternately carried upward and released, whereupon they will immediately drop by gravitation; and it is also obvious that this vertical reciprocating movement will pulverize the ground, especially as it is alternately performed by series of teeth, and that the blades of the front set of teeth will serve in the capacity of hoes, digging the ground as they enter it and the machine is drawn forward, while the blades of the rear set of teeth when they enter the ground will serve as rakes on the forward movement of the machine.

All of the teeth may be simultaneously raised or permitted to drop by the movement of a lever 22, which is located adjacent to the driver's seat. This lever is secured to one end of a crank shaft 23, provided with a crank arm which extends below the bow sections of all of the rear teeth. The crank shaft 23, is provided at its opposite end with a crank arm 24, which is connected by a link 25, with a crank arm 26, located upon one end of a crank shaft 27, constructed in like manner as the rear crank shaft 23, the forward crank shaft 27, being adapted for engagement with all of the teeth in the forward set. Thus when the lever 22 is moved in one direction, both sets of teeth will be manipulated and elevated, and when moved in the opposite direction, or to the position shown in Fig. 2, all of the teeth may drop to and enter the ground.

When the drum and the ribs 16 are made in sections, sections of the drum may be removed, and likewise sections of the ribs on the drum, and corresponding front and rear harrow teeth. In this manner a space may be provided which will enable the machine to pass over young plants and cultivate the ground at each side of the plants.

Having thus described my invention, I claim as new and desire to secure by Letters Patent—

1. In an agricultural implement, a drum provided with a series of ribs, sets of harrow teeth pivoted at each side of the drum, the sets being oppositely yet downwardly inclined, and the teeth of each set provided with shoes acted upon by the ribs on the drum, whereby the teeth are raised by the drum and dropped by gravitation, as and for the purpose specified.

2. In an agricultural implement, the combination, with a drum provided with ribs spirally arranged thereon, of sets of teeth pivoted at opposite sides of the drum, the teeth being carried at an inclination in opposite directions but downward in direction of the ground, the teeth of the forward set having a rearward inclination and the teeth of the rear set a forward inclination, and shoes located at the pivotal portion of the teeth, the said shoes being engaged by the ribs on the drum, whereby the teeth of the different sets are raised and lowered alternately, as and for the purpose described.

3. In an agricultural implement, the combination, with a frame, a drum journaled in the frame, provided with spirally located exterior ribs having a cylindrical face, and means for rotating the drum, substantially as shown and described, of sets of harrow teeth pivoted in the frame, one set in front of the other set at the rear of the drum, the teeth of the forward set being upwardly bowed and carried downwardly and rearwardly to the ground, the teeth of the rear set being upwardly bowed and then carried downwardly and forwardly to the ground, and shoes carried by all of the teeth, said shoes being acted upon by the cylindrical faces of the ribs of the drum, substantially as and for the purpose specified.

4. In an agricultural implement, the combination, with a frame, an axle journaled therein, and supporting wheels attached to the axle, and a drum secured upon the axle, provided with spirally-arranged ribs having one of their faces cylindrical, of shafts located at opposite sides of the drum, sets of teeth pivoted upon the shafts, the front set of teeth being upwardly and forwardly bowed from the shaft, and then carried rearwardly and downwardly to the ground, the rear set of teeth being upwardly and rearwardly bowed from the other shaft and then carried forwardly to the ground, shoes carried by each of the said teeth and acted upon by the ribs, said teeth being raised by the ribs and dropping by gravity, crank shafts located beneath the bow portions of the teeth, said shafts being connected, and a lever operating one of the shafts, as and for the purpose specified.

ALBERT D. POWERS.

Witnesses:
W. S. SMART,
S. W. LINEBAUGH.